United States Patent
Aparicio et al.

[11] Patent Number: 6,056,261
[45] Date of Patent: May 2, 2000

[54] SENSOR-OPERATED SOLENOID DIRECT DRIVE FLUSH VALVE

[75] Inventors: Jesse L. Aparicio, Berwyn, Ill.; Daniel J. Carroll, Hammond, Ind.; Nhon T. Vuong, Lombard, Ill.

[73] Assignee: Sloan Valve Company, Franklin Park, Ill.

[21] Appl. No.: 09/173,790

[22] Filed: Oct. 16, 1998

Related U.S. Application Data

[63] Continuation-in-part of application No. 08/962,521, Oct. 31, 1997, abandoned.

[51] Int. Cl.[7] ................................................. F16K 31/145
[52] U.S. Cl. ................. 251/129.03; 251/40; 251/129.04; 4/623
[58] Field of Search .......................... 4/623; 251/129.03, 251/129.04, 40, 45

[56] References Cited

U.S. PATENT DOCUMENTS

| | | | |
|---|---|---|---|
| 2,388,990 | 11/1945 | Nelson et al. | 251/40 X |
| 2,406,259 | 8/1946 | Russell et al. | 251/40 X |
| 2,603,794 | 7/1952 | Bokser . | |
| 2,695,154 | 11/1954 | Dillman | 251/129.03 X |
| 2,861,592 | 11/1958 | Collins | 251/129.03 X |
| 2,999,191 | 9/1961 | Mruadian et al. . | |
| 3,010,119 | 11/1961 | Franke . | |
| 3,019,453 | 2/1962 | Radcliffe . | |
| 3,034,151 | 5/1962 | Filliung . | |
| 3,056,143 | 10/1962 | Foster . | |
| 3,524,204 | 8/1970 | Rusnok . | |
| 3,928,874 | 12/1975 | Albertson . | |
| 4,195,374 | 4/1980 | Morris et al. . | |
| 4,627,597 | 12/1986 | Brausfeld et al. | 251/129.03 |
| 4,793,588 | 12/1988 | Laverty, Jr. . | |
| 4,971,287 | 11/1990 | Shaw | 251/129.04 |
| 5,341,839 | 8/1994 | Kobayashi et al. . | |
| 5,362,026 | 11/1994 | Kobayashi et al. . | |
| 5,415,374 | 5/1995 | Carroll et al. | 251/40 |
| 5,699,994 | 12/1997 | Wu | 251/129.03 |

*Primary Examiner*—John Rivell
*Assistant Examiner*—Meredith H. Schoenfeld
*Attorney, Agent, or Firm*—McEachran, Jambor, Keating, Bock & Kurtz

[57] ABSTRACT

A battery-powered, sensor-operated flush valve for controlling water flow through a toilet room device such as a urinal or water closet includes a flush valve body with an inlet and an outlet. There is a valve mechanism for controlling flow through the flush valve body. A solenoid is attached to the flush valve body and has a piston which is positioned to contact the valve mechanism relief valve. The solenoid is in circuit with a battery and a sensor whereby a user of toilet room device will cause battery power to be applied to the solenoid coil, which will in turn move the piston to contact the relief valve to institute a flushing operation.

3 Claims, 2 Drawing Sheets

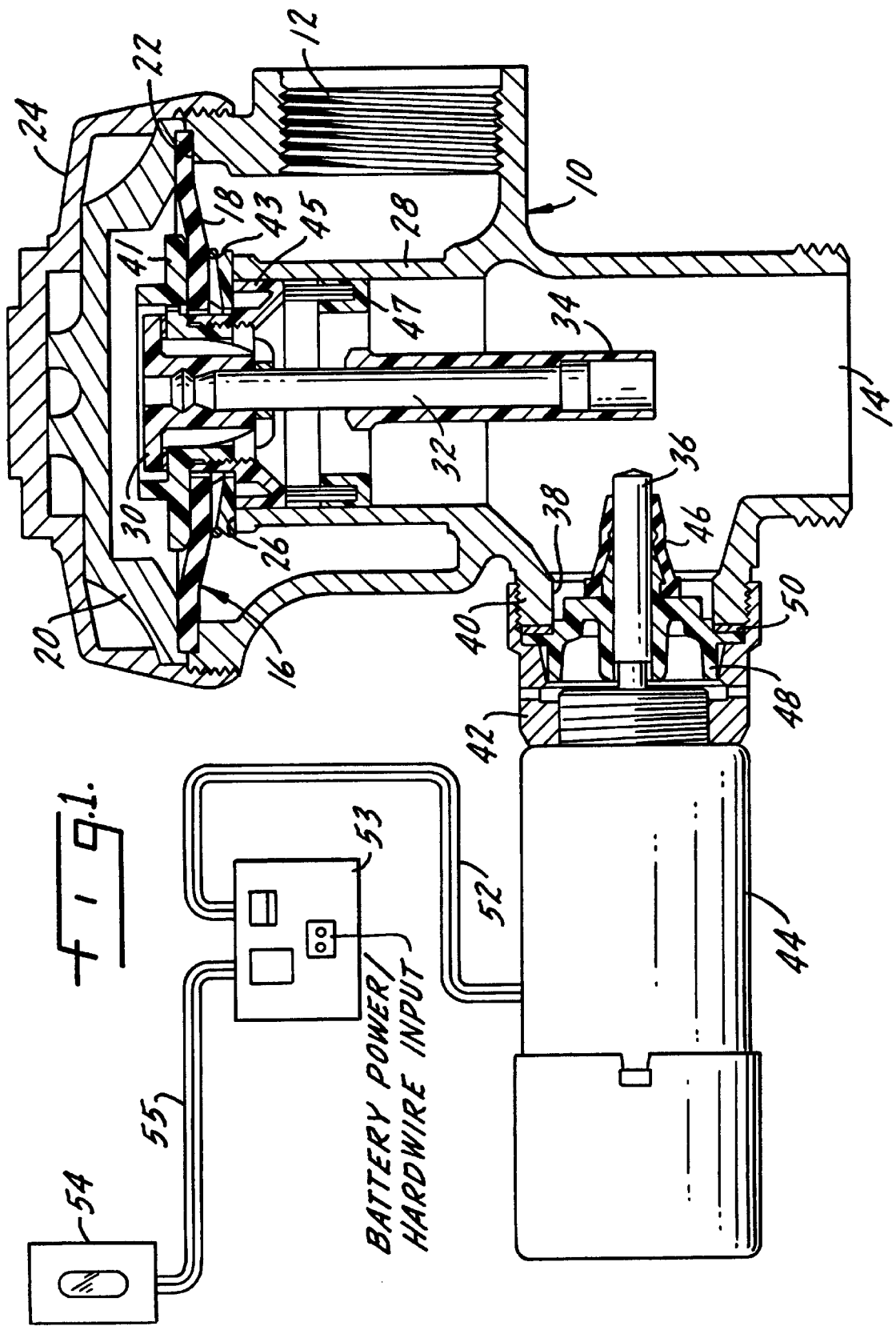

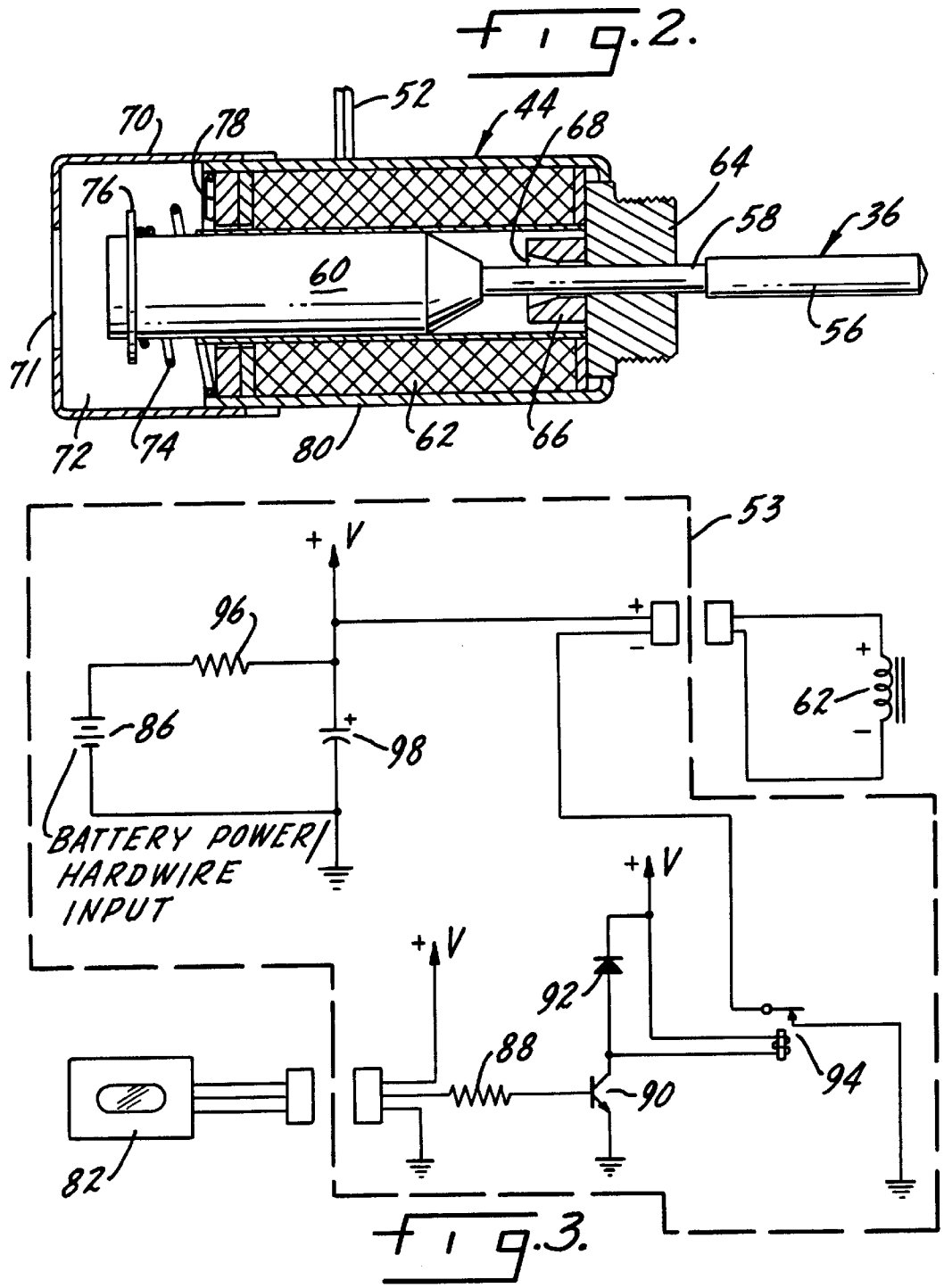

SENSOR-OPERATED SOLENOID DIRECT DRIVE FLUSH VALVE

This is a continuation-in-part of copending application Ser. No. 08/962,521 filed Oct. 31, 1997.

THE FIELD OF THE INVENTION

Battery-powered, sensor-operated flush valves are known in the plumbing art and are commonly found in public washrooms in facilities such as airports or the like. Customarily, such flush valves have the electric operator and sensor located within a housing which sits on top of the flush valve. It is also common to find manually-operated flush valves in public washrooms for operating toilet room devices such as urinals and water closets and customarily the manually-operated flush valves have a handle which extends generally horizontally from the flush valve body.

The present invention provides a sensor-operated flush valve with the electric operator, in the form of a solenoid, being located where normally one would find a manual operating lever for a flush valve. Thus, a manual flush valve can be converted to one that is sensor-operated by removal of the handle and the addition of an electric operator such as a solenoid in place of the handle, with the solenoid driving a piston or diaphragm to provide the actuating force. The solenoid may be controlled by a sensor, with the solenoid being battery powered and the sensor being located at a position to target the user of the toilet room device.

The present application is a components and cost reduction and an upgrade on U.S. Pat. No. 3,034,151. The solenoid replaces the gear mechanism while also providing a manual override.

SUMMARY OF THE INVENTION

The present invention relates to a battery-powered, sensor-operated flush valve for use on toilet room devices and in particular to a solenoid-operated flush valve in which the solenoid is attached to the flush valve body at the normal opening for a manual handle.

Another purpose is a simply constructed, reliably operable battery-powered, sensor-operated flush valve which does not change the conventional flush valve operating mechanism.

Another purpose of the invention is to provide a kit for retrofitting existing manually-operated flush valves to electric operation.

Another purpose is to provide a simplified power-operated flush valve which eliminates the hydraulic pressure assist used in prior art valves of this type.

Another purpose is a power-operated flush valve which uses a solenoid piston as a manual override.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, illustrating a flush valve of the type having an electric operator for power actuation, FIG. 2 is an enlarged axial section of the solenoid and its attachment to the flush valve body, and FIG. 3 is an electrical schematic of the circuit used to drive the solenoid-operated flush valve.

DESCRIPTION OF THE PREFERRED EMBODIMENT

The flush valve described in the present application is of the type sold by Sloan Valve Company under the trademark "ROYAL." The typical ROYAL flush valve has a manual operating handle extending from the side thereof and in the present application this handle is removed and replaced by an electric operator. The invention should not be limited to the application of an electric operator in the handle opening to a valve of the ROYAL type, but is equally applicable to any type of toilet room flush valve in which there is a manual operating handle effective to trip the stem of a relief valve.

In FIG. 1, the flushometer includes a body 10 having an inlet connection 12 and an outlet connection 14. A diaphragm assembly, indicated generally at 16, includes a diaphragm 18 peripherally held to the body 10 by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16 as shown in FIG. 1 is closed upon a valve seat 26 formed at the upper end of a barrel 28. The barrel forms the conduit connecting the valve seat with outlet 14. The diaphragm assembly 16 includes a relief valve 30 having a downwardly extending stem 32 carrying a movable sleeve 34. Sleeve 34 is positioned for contact by a piston 36 when operated by the solenoid to be described hereinafter.

The diaphragm assembly 16, in addition to the diaphragm 18 and the relief valve 30, includes a retaining disc 41, a filter disc 43, a refill ring 45, and a flow control ring 47. Further details of this type of valve may be found in U.S. Pat. No. 5,505,427, also owned by Sloan Valve Company.

Flush valve body 10 has an opening 38 formed by an outwardly-extending boss 40, an integral part of the body 10. Attached to the boss 40 is a collar 42 mounting a solenoid assembly 44 which is shown in detail in FIG. 2. The piston 36 which extends outwardly from the solenoid 44 extends through a sealing gasket 46 and a bushing 48. There may be a handle gasket 50 located between the end of the boss 40 and the facing surface of the bushing 48 to form a seal between the solenoid assembly and the flush valve body. The gasket 46 prevents the leakage of water along the surface of piston 36 into the housing of the solenoid assembly 44.

As further shown in FIG. 1, electrical wires 52 extend outwardly from the solenoid assembly 44 and are connected to a power board 53 which may utilize battery power or a hardwire commercial power source. Wires 55 connect the board to an electric circuit assembly 54 which will include a sensor. Conventionally, the circuit assembly 54 will be located in a position to target a user of the toilet device which will be flushed by the flush valve shown in FIG. 1.

FIG. 2 illustrates details of the solenoid assembly 44. The piston 36 has a first portion 56 of reduced diameter which extends through the gasket 46 and will contact the sleeve 34 extending from the relief valve. This contact will cause operation of the flush valve, as is conventional, and as is disclosed in more detail in U.S. Pat. No. 5,505,427. The piston portion 56 is connected by a somewhat smaller cross section stem 58 to a larger piston portion 60 which is located to move axially inside of a solenoid coil 62. The coil 62 will receive power through the above-described wires 52. The stem portion 58 may pass through a further bushing 64 which will be screwthreaded into the collar 42 to attach the solenoid assembly to the flush valve body. A small collar 66 having a tapered passage 68 will provide a stop for movement of the piston portion 60 when the flush valve is actuated, as described hereinafter.

The flush valve housing includes a first housing portion 70 having a chamber 72 within which is positioned a coil return spring 74. The spring is bottomed on a washer 76 and on an end surface 78 of the solenoid coil 62, with the result that the spring will normally bias the piston 36 away from the relief valve stem or to an inoperable position. There is a second housing portion 80, which with the housing portion 70, make up the complete cover for the solenoid assembly 44. The housing portion 70 has an opening 71 therein which is in axial alignment with the piston portion 60. This opening provides access for manually pushing the piston 36 to the right, as shown in FIG. 2, so as to permit manual operation in the event that the solenoid is either non-functional or the sensor system is inoperable. Thus, the piston may be used to manually operate the flush valve in the event such is required.

In FIG. 3, a battery-operated sensor, which may be an infrared sensor, is indicated at 82 and may for example be of the type disclosed in U.S. Pat. No. 5,548,119, owned by Sloan Valve Company. Infrared sensors for use in toilet room devices are well known in the art. The sensor 82 is powered by a 6-volt battery indicated at 86. A resistor 88 connects the sensor to the base of a transistor 90, the emitter of which is connected to ground with the collector being connected to a diode 92, the opposite side of which is also connected to the 6-volt battery. The output from the collector of transistor 90 is connected to the coil of a relay 94 whose contacts will complete a circuit from battery 86 through solenoid coil 62. The battery circuit includes a resistor 96 and a capacitor 98. In the alternative, the power source may be conventional electric power wired to the power board.

Thus, when the sensor is activated by a target being within its field of view, which is normally that adjacent the toilet room device, the sensor will provide a signal to the base of transistor 90, the effect of which will cause current to flow through the coil of relay 94. The closure of the relay contacts in turn will apply power from battery 86 to the solenoid coil 62. When the solenoid coil is operated, it will move piston 36 against the power of spring 74 inward toward the stem 34 of the relief valve 30. This will trip the relief valve, causing a venting of the pressure chamber above the diaphragm. As is well known in the art, the diaphragm will move off of its seat, allowing a through connection between the inlet 12 and the outlet 14 of the flush valve to provide a measured volume of water for flushing the toilet room device.

The invention is particularly useful in that it provides a simplified electric operator in the form of a solenoid, which is in direct alignment with the conventional manual operated plunger for flush valve operation. Thus, manual flush valves which are in the field can be converted to electric operation by merely removing the handle and replacing it with the solenoid and its attendant electric circuit which will include the sensor for triggering flush valve operation. In prior art electric-operated flush valves, there was normally a special cover on top of the flush valve which housed the sensor, the battery and the associated electric circuit components. This required modifications of the flush valve to provide venting of the pressure chamber on top of the diaphragm which prevented any retrofit of existing manually operated flush valves. The present invention places an electric operator in the form of a solenoid directly at the location of the flush valve handle and provides a spring retracted electrically-operable piston to cause tilting of the relief valve to cause flush valve operation.

The piston assembly within the solenoid is itself an "override" pushbutton, as it freely moves within the solenoid and can be pushed forward or pulled back by an operator. If electric power is lost, this will allow the valve to be manually vented for diaphragm replacement or other internal repair without exposing a repair person to water in the event the unit fails and must be opened.

Whereas the preferred form of the invention has been shown and described herein, it should be realized that there may be many modifications, substitutions and alterations thereto.

The embodiments of the invention in which an exclusive property or privilege is claimed are defined as follows:

1. An electric-powered, sensor-operated flush valve for controlling water flow to a toilet room device such as a urinal or water closet, including a flush valve body having an inlet and an outlet, a valve mechanism for controlling flow from said inlet to said outlet, said valve mechanism including a relief valve having an elongated stem extending toward said body outlet, an opening in said body generally in alignment with an end portion of said relief valve stem, a housing attached to said body at said opening, an electrically operable solenoid having a coil positioned within said housing, a piston coaxial with and operable by said solenoid coil and movable in a path generally perpendicular to said relief valve stem between a retracted position in which said piston is located away from said relief valve stem and an extended position in which said piston contacts said relief valve stem to cause movement thereof, a coiled spring within said housing and urging said piston away from said relief valve stem, a seal positioned about said piston to prevent water within said flush valve body from reaching said solenoid, a bushing closing an end of said housing adjacent said body opening, said piston having a first portion of reduced diameter which extends through said seal for contact with said relief valve stem, a second portion of a diameter less than said first portion, which second portion extends through said bushing, said piston having a third portion, larger in diameter than either said first portion or said second portion, which third portion is located within and movable within said solenoid coil, an outwardly-extending flange on an end of said third portion remote from said bushing, said coiled spring being coaxially about said piston third portion, and in contact with said flange, and being located outside of said solenoid coil and within said housing, an electrical circuit for operating said solenoid coil including a sensor to detect the presence of a user of said toilet room device, and a power source in circuit with said sensor and coil for applying power to said coil in response to a detection signal from said sensor, said sensor and electric circuit being located remote from said housing and electrically connected to said coil within said housing.

2. The flush valve of claim 1 wherein said power source is a battery.

3. The flush valve of claim 1 including an opening in said housing in axial alignment with said piston to permit manual movement of said piston, against the force of said spring, to move said piston toward said relief valve stem.

* * * * *